(12) United States Patent
Cheng et al.

(10) Patent No.: US 10,897,295 B2
(45) Date of Patent: Jan. 19, 2021

(54) SYSTEM AND METHOD FOR BEAM INDEXING REFERENCE SIGNAL DESIGN FOR INITIAL ACCESS

(71) Applicant: Futurewei Technologies, Inc., Plano, TX (US)

(72) Inventors: Qian Cheng, Aurora, IL (US); Jialing Liu, Palatine, IL (US); Weimin Xiao, Hoffman Estates, IL (US); Majid Ghanbarinejad, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 254 days.

(21) Appl. No.: 15/486,551

(22) Filed: Apr. 13, 2017

(65) Prior Publication Data
US 2018/0302135 A1    Oct. 18, 2018

(51) Int. Cl.
| | | |
|---|---|---|
| *H04W 72/00* | (2009.01) | |
| *H04B 7/06* | (2006.01) | |
| *H04W 72/04* | (2009.01) | |
| *H04J 13/00* | (2011.01) | |
| *H04L 5/00* | (2006.01) | |

(Continued)

(52) U.S. Cl.
CPC ......... *H04B 7/0617* (2013.01); *H04B 7/0695* (2013.01); *H04J 13/0062* (2013.01); *H04L 5/005* (2013.01); *H04W 56/0005* (2013.01); *H04W 72/005* (2013.01);

(Continued)

(58) Field of Classification Search
CPC ... H04W 72/04; H04W 72/082; H04W 16/10; H04W 56/0005; H04W 72/005; H04B 7/0617; H04B 7/0695
See application file for complete search history.

(56) References Cited

U.S. PATENT DOCUMENTS

| | | |
|---|---|---|
| 6,728,295 B1 | 4/2004 | Nallanathan et al. |
| 2012/0327975 A1 | 12/2012 | Michaels |

(Continued)

FOREIGN PATENT DOCUMENTS

| | | |
|---|---|---|
| CN | 102347946 A | 2/2012 |
| CN | 104378122 A | 2/2015 |

(Continued)

OTHER PUBLICATIONS

Huawei et al., "NR Primary and Secondary Synchronization Signals Design",3GPP TSG RAN WG1 Meeting #87 R1-1611261,Reno, USA, Nov. 14-18, 2016,total 10 pages.

(Continued)

*Primary Examiner* — Shantell L Heiber
(74) *Attorney, Agent, or Firm* — Slater Matsil, LLP

(57) ABSTRACT

A method for wireless communications is provided. The method includes transmitting a first signal during a first time interval. The first signal is encoded with a first spreading sequence generated by permutating a root sequence based on a permutation parameter associated with a first index. The method further includes transmitting a second signal during a second time interval. The second signal is encoded with a second spreading sequence generated by permutating the root sequence based on a permutation parameter associated with a second index. The method further includes receiving an indication of either the first index or the second index from a user equipment (UE).

27 Claims, 12 Drawing Sheets

(51) Int. Cl.
*H04W 56/00* (2009.01)
*H04W 16/28* (2009.01)

(52) U.S. Cl.
CPC ......... *H04W 72/046* (2013.01); *H04L 5/0053* (2013.01); *H04W 16/28* (2013.01)

(56) References Cited

U.S. PATENT DOCUMENTS

| | | | |
|---|---|---|---|
| 2014/0050076 A1* | 2/2014 | Popovic | H01J 13/0062 |
| | | | 370/208 |
| 2016/0227526 A1* | 8/2016 | Park | H04L 5/0048 |
| 2016/0270015 A1* | 9/2016 | Lin | H04W 56/0015 |
| 2016/0308637 A1* | 10/2016 | Frenne | H04J 11/0069 |
| 2016/0360452 A1* | 12/2016 | Koorapaty | H04J 11/0069 |
| 2017/0111806 A1* | 4/2017 | Roh | H04W 16/28 |
| 2018/0359790 A1* | 12/2018 | Ingale | H04W 28/16 |
| 2019/0013857 A1* | 1/2019 | Zhang | H04B 7/0626 |
| 2019/0028222 A1 | 1/2019 | Frenne et al. | |
| 2019/0104549 A1* | 4/2019 | Deng | H04B 7/0617 |

FOREIGN PATENT DOCUMENTS

| | | |
|---|---|---|
| CN | 105723639 A | 6/2016 |
| EP | 3264829 A1 | 1/2018 |
| WO | 2016154835 A1 | 10/2016 |

OTHER PUBLICATIONS

Huawei et al., "Unified single/multiple beam operations for initial access",3GPP TSG RAN WG1 Meeting #87 R1-1611667,Reno, USA, Nov. 14-18, 2016,total 10 pages.

\* cited by examiner

N=63, u=29

| A = | 2  | 4  | 5  | 8  | 10 | 11 | 13 | 16 | 17 |
|-----|----|----|----|----|----|----|----|----|----|
| U = | 53 | 23 | 32 | 29 | 2  | 44 | 50 | 53 | 2  |
| B = | 47 | 39 | 50 | 35 | 9  | 11 | 48 | 33 | 44 |
| C = | 6  | 30 | 48 | 63 | 9  | 51 | 21 | 6  | 9  |
| A = | 19 | 20 | 22 | 23 | 25 | 26 | 29 | 31 | 32 |
| U = | 11 | 8  | 50 | 32 | 44 | 11 | 8  | 23 | 23 |
| B = | 36 | 20 | 21 | 5  | 60 | 8  | 56 | 30 | 32 |
| C = | 27 | 42 | 21 | 48 | 51 | 27 | 42 | 30 | 30 |
| A = | 34 | 37 | 38 | 40 | 41 | 43 | 44 | 46 | 47 |
| U = | 8  | 11 | 44 | 32 | 50 | 8  | 11 | 2  | 53 |
| B = | 6  | 54 | 2  | 57 | 41 | 42 | 26 | 18 | 29 |
| C = | 42 | 27 | 51 | 48 | 21 | 42 | 27 | 9  | 6  |
| A = | 50 | 52 | 53 | 55 | 58 | 59 | 61 | 62 |    |
| U = | 50 | 44 | 2  | 29 | 32 | 23 | 53 | 29 |    |
| B = | 14 | 51 | 53 | 27 | 12 | 23 | 15 | 62 |    |
| C = | 21 | 51 | 9  | 63 | 48 | 30 | 6  | 63 |    |

| A = | 2  | 4  | 5  | 8  | 10 | 11 | 13 | 16 | 17 |
|-----|----|----|----|----|----|----|----|----|----|
| U = | 37 | 22 | 58 | 25 | 43 | 1  | 4  | 37 | 43 |
| B = | 47 | 39 | 50 | 35 | 9  | 11 | 48 | 33 | 44 |
| C = | 3  | 15 | 24 | 63 | 36 | 57 | 42 | 3  | 36 |
| A = | 19 | 20 | 22 | 23 | 25 | 26 | 29 | 31 | 32 |
| U = | 16 | 46 | 4  | 58 | 1  | 16 | 46 | 22 | 22 |
| B = | 36 | 20 | 21 | 5  | 60 | 8  | 56 | 30 | 32 |
| C = | 45 | 21 | 42 | 24 | 57 | 45 | 21 | 15 | 15 |
| A = | 34 | 37 | 38 | 40 | 41 | 43 | 44 | 46 | 47 |
| U = | 46 | 16 | 1  | 58 | 4  | 46 | 16 | 43 | 37 |
| B = | 6  | 54 | 2  | 57 | 41 | 42 | 26 | 18 | 29 |
| C = | 21 | 45 | 57 | 24 | 42 | 21 | 45 | 36 | 3  |
| A = | 50 | 52 | 53 | 55 | 58 | 59 | 61 | 62 |    |
| U = | 4  | 1  | 43 | 25 | 58 | 22 | 37 | 25 |    |
| B = | 14 | 51 | 53 | 27 | 12 | 23 | 15 | 62 |    |
| C = | 42 | 57 | 36 | 63 | 24 | 15 | 3  | 63 |    |

FIG. 14

| N=63, u=34 | | | | | | | | |
|---|---|---|---|---|---|---|---|---|
| A = | 2 | 4 | 5 | 8 | 10 | 11 | 13 | 16 | 17 |
| U = | 53 | 23 | 32 | 29 | 2 | 44 | 50 | 53 | 2 |
| B = | 47 | 39 | 50 | 35 | 9 | 11 | 48 | 33 | 44 |
| C = | 57 | 33 | 15 | 63 | 54 | 12 | 42 | 57 | 54 |
| A = | 19 | 20 | 22 | 23 | 25 | 26 | 29 | 31 | 32 |
| U = | 11 | 8 | 50 | 32 | 44 | 11 | 8 | 23 | 23 |
| B = | 36 | 20 | 21 | 5 | 60 | 8 | 56 | 30 | 32 |
| C = | 36 | 21 | 42 | 15 | 12 | 36 | 21 | 33 | 33 |
| A = | 34 | 37 | 38 | 40 | 41 | 43 | 44 | 46 | 47 |
| U = | 8 | 11 | 44 | 32 | 50 | 8 | 11 | 2 | 53 |
| B = | 6 | 54 | 2 | 57 | 41 | 42 | 26 | 18 | 29 |
| C = | 21 | 36 | 12 | 15 | 42 | 21 | 36 | 54 | 57 |
| A = | 50 | 52 | 53 | 55 | 58 | 59 | 61 | 62 | |
| U = | 50 | 44 | 2 | 29 | 32 | 23 | 53 | 29 | |
| B = | 14 | 51 | 53 | 27 | 12 | 23 | 15 | 62 | |
| C = | 42 | 12 | 54 | 63 | 15 | 33 | 57 | 63 | |

FIG. 15

| ONE NUMERICAL EXAMPLE: N=47, u=17 | | | | | | | | | | | |
|---|---|---|---|---|---|---|---|---|---|---|---|
| A = | 1 | 2 | 3 | 4 | 5 | 6 | 7 | 8 | 9 | 10 | 11 | 12 |
| U = | 13 | 21 | 12 | 37 | 2 | 1 | 34 | 7 | 14 | 8 | 36 | 4 |
| B = | 0 | 35 | 31 | 29 | 9 | 27 | 13 | 26 | 10 | 16 | 38 | 25 |
| C = | 0 | 1 | 34 | 5 | 8 | 43 | 16 | 21 | 11 | 33 | 40 | 32 |
| A = | 13 | 14 | 15 | 16 | 17 | 18 | 19 | 20 | 21 | 22 | 23 | 24 |
| U = | 6 | 42 | 18 | 28 | 25 | 9 | 27 | 32 | 24 | 3 | 16 | 16 |
| B = | 14 | 18 | 34 | 1 | 41 | 40 | 2 | 43 | 4 | 7 | 22 | 24 |
| C = | 9 | 18 | 12 | 38 | 2 | 45 | 26 | 39 | 37 | 20 | 35 | 35 |
| A = | 25 | 26 | 27 | 28 | 29 | 30 | 31 | 32 | 33 | 34 | 35 | 36 |
| U = | 3 | 24 | 32 | 27 | 9 | 25 | 28 | 18 | 42 | 6 | 4 | 36 |
| B = | 39 | 42 | 3 | 44 | 6 | 5 | 45 | 12 | 28 | 32 | 21 | 8 |
| C = | 20 | 37 | 39 | 26 | 45 | 2 | 38 | 12 | 18 | 9 | 32 | 40 |
| A = | 37 | 38 | 39 | 40 | 41 | 42 | 43 | 44 | 45 | 46 | | |
| U = | 8 | 14 | 7 | 34 | 1 | 2 | 37 | 12 | 21 | 17 | | |
| B = | 30 | 36 | 20 | 33 | 19 | 37 | 17 | 15 | 11 | 46 | | |
| C = | 33 | 11 | 21 | 16 | 43 | 8 | 5 | 34 | 1 | 47 | | |

FIG. 16

SYSTEM AND METHOD FOR BEAM INDEXING REFERENCE SIGNAL DESIGN FOR INITIAL ACCESS

TECHNICAL FIELD

This application relates generally to telecommunications, and in particular embodiments, to systems and methods for beam indexing reference signal design for initial access.

BACKGROUND

Wireless signals communicated at high carrier frequencies, such as millimeter Wave (mmW) signals, tend to exhibit high free-space path loss. To compensate for high path loss rates, high-frequency communications may use beamforming at both the transmitter and receiver. This may require the transmitter and receiver to engage in a beam-scanning operation during link establishment to determine which transmit (TX) and receive (RX) beam directions will be used to transmit and receive data signals. As used herein, the term "beam direction" refers to a radio antenna pattern that is used for directional signal transmission and/or reception. It may also be helpful for the transmitter and receiver to perform periodic beam-tracking operations after link establishment so that the beam direction(s) can be adjusted to compensate for changes in the condition of the air interface and/or relative positioning of the transmitter and receiver.

SUMMARY

Technical advantages are generally achieved, by embodiments of this disclosure which describe systems and methods for beam indexing reference signal design for initial access.

Aspects of this disclosure provide an embodiment method for wireless communications. In this embodiment, the method includes transmitting a first signal during a first time interval, and transmitting a second signal during a second time interval. The first signal is encoded with a first spreading sequence generated by permutating a root sequence based on a permutation parameter associated with a first index. The second signal is encoded with a second spreading sequence generated by permutating the root sequence based on a permutation parameter associated with a second index. The method further includes receiving an indication of either the first index or the second index from a user equipment (UE). In one example of this embodiment, a cross-correlation between the first spreading sequence and the second spreading sequence is less than $$\frac{1}{\sqrt{N}},$$

where N is a length of the root sequence. Optionally, in the same example, or a different example, of this embodiment, the root sequence is a Zadoff-Chu sequence. Optionally, in any one of the preceding examples, or in a different example, of this embodiment, the Zadoff-Chu sequence may associated with a root index equal to 25, 29, or 34, and the Zadoff-Chu sequence may have a length of 63 symbols. Optionally, in any one of the preceding examples, or in a different example, of this embodiment, a length of the Zadoff-Chu sequence is equal a prime number of symbols. Optionally, in any one of the preceding examples, or in a different example, of this embodiment, a length of the Zadoff-Chu sequence is equal to 127 symbols. Optionally, in any one of the preceding examples, or in a different example, of this embodiment, the first signal is one of a synchronization signal and a reference signal. Optionally, in any one of the preceding examples, or in a different example, of this embodiment, the first signal is a primary synchronization signal (PSS). Optionally, in any one of the preceding examples, or in a different example, of this embodiment, the first index is a beam index associated with a beam direction used to transmit the first signal. Optionally, in any one of the preceding examples, or in a different example, of this embodiment, the permutation parameter associated with the first index is a modular parameter associated with the first index. Optionally, in any one of the preceding examples, or in a different example, of this embodiment, the mapping between the modular parameter and the first index is pre-defined. Optionally, in any one of the preceding examples, or in a different example, of this embodiment, the mapping between the modular parameter and the first index is encoded and transmitted in a broadcast channel. Optionally, in any one of the preceding examples, or in a different example, of this embodiment, the broadcast channel is a physical broadcast channel (PBCH). Optionally, in any one of the preceding examples, or in a different example, of this embodiment, the mapping between the modular parameter and the first index is encoded and signaled through an assisted frequency layer. Optionally, in any one of the preceding examples, or in a different example, of this embodiment, the first signal is transmitted during a first time interval and the second signal during a second time interval, and the first time interval and the second time interval are separated by a fixed transmission gap. Optionally, in any one of the preceding examples, or in a different example, of this embodiment, the fixed transmission gap between the first time interval and the second time interval is pre-defined. Optionally, in any one of the preceding examples, or in a different example, of this embodiment, the fixed transmission gap between the first time interval and the second time interval is encoded and signaled through an assisted frequency layer. Optionally, in any one of the preceding examples, or in a different example, of this embodiment, the fixed transmission gap between the first time interval and the second time interval is encoded and transmitted in a broadcast channel. Optionally, in any one of the preceding examples, or in a different example, of this embodiment, the broadcast channel is a physical broadcast channel (PBCH). Optionally, in any one of the preceding examples, or in a different example, of this embodiment, the fixed transmission gap between the first time interval and the second time interval is encoded and signaled through an assisted frequency layer. Optionally, in any one of the preceding examples, or in a different example, of this embodiment, the method further comprises transmitting a signal to the UE over quasi co-located (QCL) antenna ports associated with the index indicated by the indication received from the UE. An apparatus for performing any one of the preceding examples of this embodiment method is also provided.

Aspects of this disclosure provide another method for wireless communications. In this embodiment, the method includes receiving a first signal from a first network node during a first time interval, and decoding the first signal in accordance with a first spreading sequence. The first spreading sequence is generated by permutating a root sequence based on a permutation parameter associated with a first index. The method further includes deriving the first index based on the spreading sequence used to detect the first signal, and transmitting an indication of the first index to a first network node or a second network node. In one example of this embodiment, the indication is sent to the first network node. Optionally, in the same example, or a different example, of this embodiment, the first spreading sequence belongs to a set of spreading sequences generated based on different permutations of the root sequence, and a cross-correlation between the first spreading sequence and a second spreading sequence in the set of spreading sequences is less than $$\frac{1}{\sqrt{N}},$$

where N is a length of the root sequence. Optionally, in any one of the preceding examples, or in a different example, of this embodiment, the root sequence is a Zadoff-Chu sequence. Optionally, in any one of the preceding examples, or in a different example, of this embodiment, the Zadoff-Chu sequence may associated with a root index equal to 25, 29, or 34, and the Zadoff-Chu sequence may have a length of 63 symbols. Optionally, in any one of the preceding examples, or in a different example, of this embodiment, a length of the Zadoff-Chu sequence is equal a prime number of symbols. Optionally, in any one of the preceding examples, or in a different example, of this embodiment, a length of the Zadoff-Chu sequence is equal to 127 symbols. Optionally, in any one of the preceding examples, or in a different example, of this embodiment, the first signal is one of a synchronization signal and a reference signal. Optionally, in any one of the preceding examples, or in a different example, of this embodiment, the first signal is a primary synchronization signal (PSS). Optionally, in any one of the preceding examples, or in a different example, of this embodiment, the first index is a beam index associated with a beam direction used to transmit the first signal. Optionally, in any one of the preceding examples, or in a different example, the permutation parameter associated with the first index is a modular parameter associated with the first index. Optionally, in any one of the preceding examples, or in a different example, the mapping between the modular parameter and the first index is predefined. Optionally, in any one of the preceding examples, or in a different example, the mapping between the modular parameter and the first index is encoded and transmitted in a broadcast channel. Optionally, in any one of the preceding examples, or in a different example, the broadcast channel is a physical broadcast channel (PBCH). Optionally, in any one of the preceding examples, or in a different example, the mapping between the modular parameter and the first index is encoded and signaled through an assisted frequency layer. Optionally, in any one of the preceding examples, or in a different example, detecting the first signal in the first time interval according to the spreading sequence comprises attempting to blindly decode a signal response received during the first time interval using different spreading sequences in a set of spreading sequences, where each spreading sequence in the set of spreading sequences being a different permutation of the root sequence. An apparatus for performing any one of the preceding examples of this embodiment method is also provided.

Aspects of this disclosure provide a method for beam scanning. In this embodiment, the method includes scanning for a beamformed reference signal in a first time interval by attempting to blindly decode the beamformed reference signal using different spreading sequences in a set of spreading sequences, identifying a beam index based on a specific spreading sequence that was used to successfully decode the beamformed reference signal, and transmitting an indication of the beam index to a base station. In one example of this embodiment, each spreading sequence in the set of spreading sequences has zero cross-correlation with other spreading sequences in the set of spreading sequences. Optionally, in the same example, or a different example, of this embodiment, the beamformed reference signal is a primary synchronization signal (PSS). Optionally, in any one of the preceding examples, or in a different example, of this embodiment, both the PSS and a first instance of a common physical broadcast channel (PBCH) signal are transmitted in the first time interval using a beam direction associated with the beam index. Optionally, in any one of the preceding examples, or in a different example, of this embodiment, the first instance of the common PBCH signal does not specify the beam index. Optionally, in any one of the preceding examples, or in a different example, of this embodiment, the method further comprises receiving at least a second instance of the common PBCH signal during a second time interval, where the second instance of the common PBCH signal is transmitted using a different beam direction than the first instance of the common PBCH signal, combining bits in the first instance of the common PBCH signal with bits in the second instance of the common PBCH signal to obtain a soft combination of bits in the common PBCH signal, and decoding the soft combination of bits in the common PBCH signal to obtain control information. An apparatus for performing any one of the preceding examples of this embodiment method is also provided.

Aspects of this disclosure provide a method another method for beam-scanning. In this embodiment, the method includes scanning for beamformed reference signals in a first sequence of time intervals by attempting to blindly decode a corresponding beamformed reference signal during each time interval in the first sequence of time intervals using a common spreading sequence. A first instance of a beamformed reference signal is successfully decoded during a first time interval using the common spreading sequence. The first time interval in the first sequence of time intervals is mapped to a second time interval in a second sequence of time intervals. The method further includes scanning for a second instance of the beamformed reference signal in a second time interval by attempting to blindly decode the second instance of the beamformed reference signal using different spreading sequences in a set of spreading sequences, identifying a beam index based on a specific spreading sequence used to successfully decode the beamformed reference signal, and transmitting an indication of the beam index to a base station. In one example of this embodiment, each spreading sequence in the set of spreading sequences has zero cross-correlation with other spreading sequences in the set of spreading sequences. Optionally, in the same example, or a different example, of this embodiment, the beamformed reference signal is a primary synchronization signal (PSS). Optionally, in any one of the preceding examples, or in a different example, of this embodiment, both the PSS and a first instance of a common physical broadcast channel (PBCH) signal are transmitted in the first time interval using a beam direction associated with the beam index. Optionally, in any one of the preceding examples, or in a different example, of this embodiment, the first instance of the common PBCH signal does not specify the beam index. Optionally, in any one of the preceding examples, or in a different example, of this embodiment, the method further comprises receiving at least a second instance of the common PBCH signal during a second time interval, where the second instance of the common PBCH signal being transmitted using a different beam direction than the first instance of the common PBCH signal, combining bits in the first instance of the common PBCH signal with bits in the second instance of the common PBCH signal to obtain a soft combination of bits in the common PBCH signal, and decoding the soft combination of bits in the common PBCH signal to obtain control information. An apparatus for performing any one of the preceding examples of this embodiment method is also provided.

In accordance with an embodiment, another method for beam-scanning is provided. In this example, the method includes scanning for beamformed reference signals during a sequence of time intervals. Each of the beamformed reference signals is transmitted during a different time interval in the sequence of time intervals. Scanning for the beamformed reference signals during the sequence of time intervals comprises attempting to blindly decode each of the beamformed reference signals using a set of spreading sequences. The method further includes identifying a beam index based on a specific spreading sequence used to successfully decode a given one of the beamformed reference signals having a highest quality or power level, and transmitting an indication of the beam index to a base station. In one example of this embodiment, each spreading sequence in the set of spreading sequences has zero cross-correlation with other spreading sequences in the set of spreading sequences. In the same example, or in a different example, of this embodiment, the beamformed reference signals are primary synchronization signals (PSSs). An apparatus for performing any one of the preceding examples of this embodiment method is also provided.

BRIEF DESCRIPTION OF THE DRAWINGS

For a more complete understanding of embodiments of this disclosure, and the advantages thereof, reference is now made to the following descriptions taken in conjunction with the accompanying drawings, in which:

FIG. 13 is a diagram of a look up table configured to be used during beam-scanning;

FIG. 14 is a diagram of another look up table configured to be used during beam-scanning;

FIG. 15 is a diagram of yet another look up table configured to be used during beam-scanning;

FIG. 16 is a diagram of yet another look up table configured to be used during beam-scanning;

DETAILED DESCRIPTION OF ILLUSTRATIVE EMBODIMENTS

Figure 1:
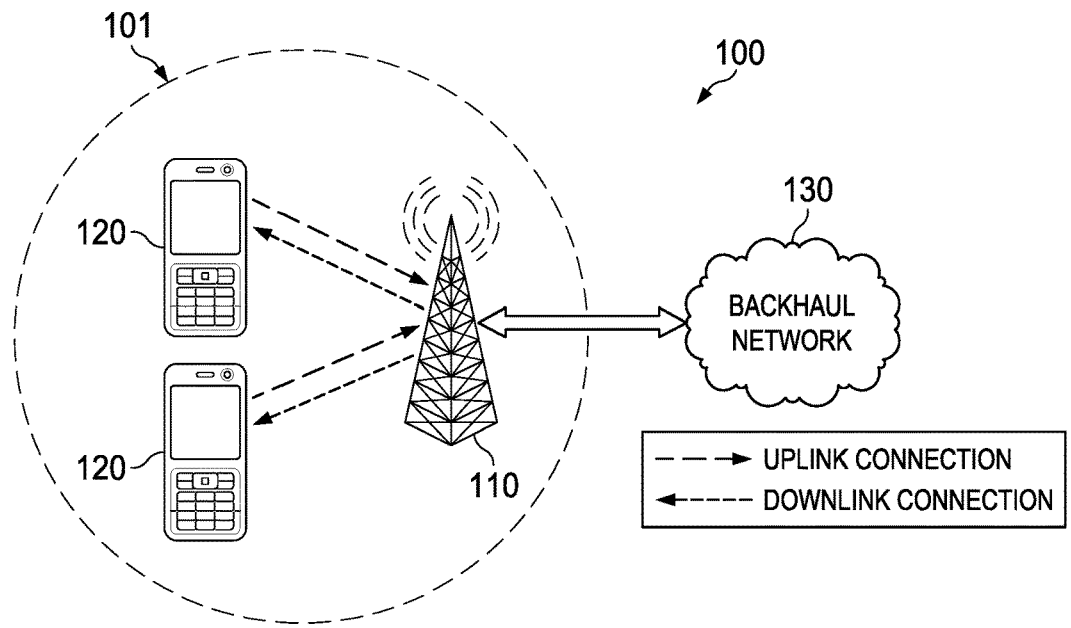
FIG. 1 is a diagram of a network for communicating data.

The structure, manufacture and use of embodiments are discussed in detail below. It should be appreciated, however, that the embodiments of this disclosure provide many applicable inventive concepts that can be embodied in a wide variety of specific contexts. The specific embodiments discussed are merely illustrative of specific ways to make and use the claimed embodiments, and do not limit the scope of the claims.

During beam-scanning, a base station typically transmits beamformed reference signals using different beam directions and during a sequence of time intervals. Each beamformed reference signal is generally accompanied by a physical broadcast channel (PBCH) signal, which carries a set of transmission parameters that are to be used when accessing the cell. For example, the base station may use a first transmit (TX) beam direction to transmit a first primary synchronization signal (PSS) and a first PBCH signal during a first time interval, a second TX beam direction to transmit a second PSS and a second PBCH signal in a second time interval, and so on and so-forth. When using conventional beam-scanning protocols, the base station also encodes a beam index associated with the corresponding transmit (TX) beam into each PBCH signal. The UE then decodes the PBCH signal associated with the beamformed reference signal having the highest channel quality or received signal power, and reports the beam index carried by that PBCH signal to the base station. Although this disclosure often states that the UE reports the beam index associated with the beamformed reference signal having the highest channel quality or received signal power, it should be appreciated that this is simply one implementation of beam-scanning protocols, and that embodiments of this disclosure may be applicable to other examples. For instance, the UE may report beam indices for multiple beamformed reference signals, e.g., for all beamformed reference signals having a quality/power level that exceeds a threshold, etc.

Because the PBCH signals indicate transmission parameters that are to be used for initial cell access, the UE may need to successfully decode one of the PBCH signals in order to achieve link establishment. Much of the information carried by the PBCH signals is the same. For example, each PBCH signal general carries the same set of transmission parameters, and specifies the same cell information. One way to transmit the beam index is for each PBCH signal to carry a different beam index, in which case the encoded payload of the respective PBCH signals would differ slightly. This prevents the UE from jointly decoding multiple PBCH signals using coherent decoding/demodulation techniques (e.g., soft-combining, etc.), which can be employed for processing two or more received signals carrying the same encoded payload.

Aspects of this disclosure provide embodiment beam-scanning protocols that implicitly signal a beam-index associated with a beamformed reference signal using a spreading sequence. In particular, a base station uses different spreading sequences, in a set of spreading sequences, to encode beamformed reference signals prior to transmitting the beamformed reference signals over different beam directions. Each spreading sequence in a given set of spreading sequences may be generated by permutating a root sequence (e.g., a Zadoff-Chu sequence) using a different modular permutation parameter and/or index. Due to the mathematical properties of the root sequence, any two spreading sequences in a given set will generally have cross-correlation that is smaller than a threshold, e.g., less than $$\frac{1}{\sqrt{N}},$$

where N is the length of the root sequence. Such low cross-correlation between the spreading sequences allows the beamformed reference signals to be received using blind detection.

More specifically, a UE will attempt to blindly decode a beamformed reference signal received in a given timeslot using different spreading sequences in the set of spreading sequences until the signal is successfully decoded, or it is otherwise determined that signal cannot be decoded using any of the spreading sequences (e.g., as may occur when the spatial properties of the corresponding beam direction are ill-suited for the connection). The UE then reports, to the base station, an index associated with the spreading sequence that was used to successfully decode the beamformed reference signal having the highest quality/received-power level. Because each spreading sequence is used to encode beamformed reference signals transmitted over different beam directions, the index allows the base station to identify which of the beam directions provides the best performance (or acceptable performance).

By virtue of using the spreading sequences to identify the corresponding beam directions, it is not necessary to encode beam indices into the PBCH signals. As a result, the PBCH signals may carry identical encoded payloads, which allows multiple PBCH signals to be jointly decoded using coherent decoding/demodulation techniques.

Attempting to blindly decode beamformed reference signals during each time interval using the entire set of spreading sequences may be relatively complex, particularly when a relatively large set of beam directions are used. By way of example, if eight beam directions are used, then the UE may need to perform blind decoding operations for each available root sequence (e.g., u=29, u=25, u=34, etc.) in each of the eight time intervals. Embodiments of this disclosure further provide lower complexity beam-scanning protocols that reduces the number of blind decoding iterations performed by the UE. In particular, the lower complexity beam-scanning protocols communicate the beamformed reference signals over two sequences of periodically recurring time intervals. During the first sequence of time intervals ($t_{10}$, $t_{11}$, ... $t_{1n}$), the base station encodes each beamformed reference signal using the same spreading sequence (e.g., the root sequence). During the second sequence of time intervals ($t_{20}$, $t_{21}$, ... $t_{2n}$), the base station encodes each beamformed reference signal using a different spreading sequence in a set of spreading sequences.

The UE then uses a single spreading sequence to decode the beamformed reference signals received during each time interval in the first sequence of time intervals ($t_{10}$, $t_{11}$, ... $t_1n$), and identifies a time interval ($t_{1x}$) that carries the beamformed reference signal having the highest quality/received-power level. The UE then performs blind detection using the set of spreading sequences during a corresponding time interval ($t_{2x}$) in the second sequence of time intervals, and reports back the beam index associated with the beamformed reference signal received during the corresponding time interval. Notably, the same beam direction is used to transmit beamformed reference signals over each pair of corresponding time intervals ($t_{1x}$, $t_{2x}$). For example, if a set of four beam directions are swept, then the first beam direction may be used to transmit beamformed reference signals over the first pair of time intervals <$t_{10}$, $t_{20}$>, the second beam direction may be used to transmit beamformed reference signals over the second pair of time intervals <$t_{11}$, $t_{21}$>, the third beam direction may be used to transmit beamformed reference signals over the third pair of time intervals <$t_{12}$, $t_{22}$>, and the fourth beam direction may be used to transmit beamformed reference signals over the fourth pair of time intervals <$t_{12}$, $t_{22}$>. These and other features are discussed in greater detail below.

FIG. 1 is a network 100 for communicating data. The network 100 comprises a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a base station (BS) or transmit/receive point (TRP), a macro-cell, a femtocell, a Wi-Fi access point (AP), or other wirelessly enabled devices. Base stations may provide wireless access in accordance with one or more wireless communication protocols, e.g., 5th generation (5G) new radio (NR), long term evolution (LTE), LTE advanced (LTE-A), High Speed Packet Access (HSPA), Wi-Fi 802.11a/b/g/n/ac/ad/ax/ay, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
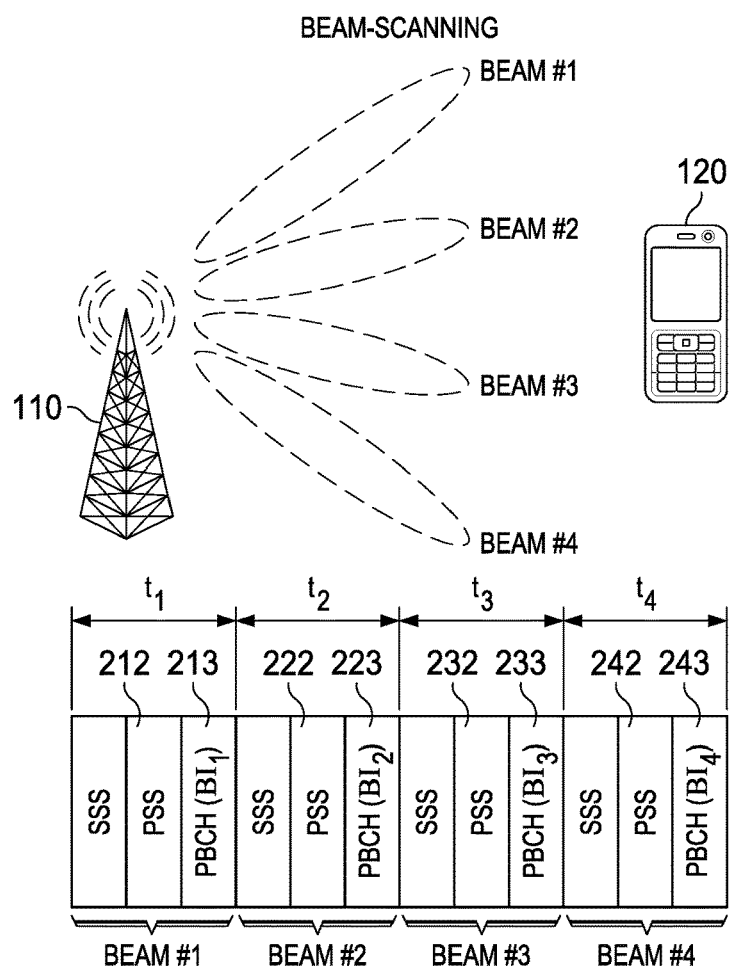
FIG. 2 is a diagram of a conventional beam-scanning protocol.

FIG. 2 is a diagram of a conventional beam-scanning technique. As shown, the base station 110 transmits a PSS 212 and a PBCH signal 213 using a first beam direction (Beam #1) during a first time interval ($t_1$), a PSS 222 and a PBCH signal 223 using a second beam direction (Beam #2) during a second time interval ($t_2$), a PSS 232 and a PBCH signal 233 using a third beam direction (Beam #3) during a third time interval ($t_3$), and a PSS 242 and a PBCH signal 243 using a fourth beam direction (Beam #4) during a fourth time interval ($t_4$). A secondary synchronization signal (SSS) may accompany the PSSs and PBCH signals in each of the respective time intervals. In addition to carrying initial access parameters, the PBCH signals 213, 223, 233, 243 carry beam indices associated with the respective beam direction used to transmit the signals in the corresponding time interval. More specifically, the PBCH signal 213 carries a first beam index (BI$_1$) associated with beam #1, the PBCH signal 223 carries a second beam index (BI$_2$) associated with beam #2, the PBCH signal 233 carries a third beam index (BI$_3$) associated with beam #3, and the PBCH signal 243 carries a fourth beam index (BI$_4$) associated with beam #4. Because the PBCH signals 213, 223, 233, 243 carry different beam indices, their encoded payloads differ slightly, which prevents the UE 120 from jointly decoding the PBCH signals 213, 223, 233, 243 using coherent decoding/demodulation techniques (e.g., soft-combining, etc.).

Embodiment beam-scanning protocols implicitly signal a beam-index associated with a beamformed reference signal based on the spreading sequence used to encode the beamformed reference signals. This obviates the need to encode different beam indices into the PBCH signals, thereby allowing multiple PBCH signals to be decoded using coherent decoding/demodulation techniques.

Figure 3:
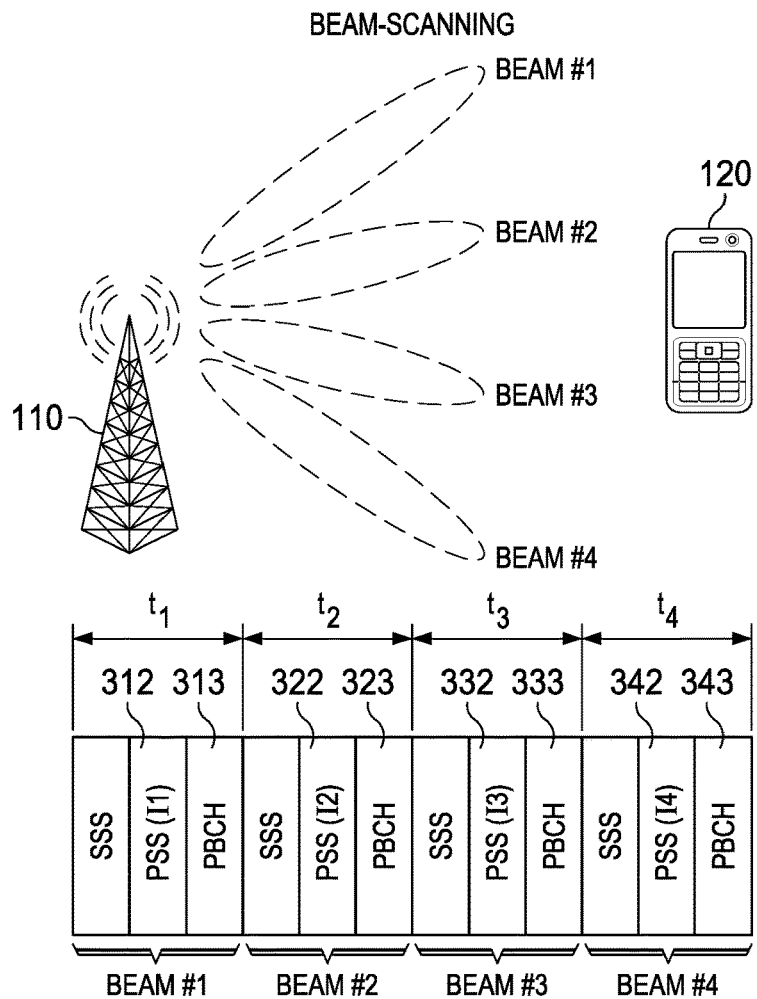
FIG. 3 is a diagram of an embodiment beam-scanning protocol.

FIG. 3 is a diagram of an embodiment beam-scanning technique. As shown, the base station 110 transmits a PSS 312 and a PBCH signal 313 using Beam #1 during time interval t$_1$, a PSS 322 and a PBCH signal 323 using Beam #2 during time interval t$_2$, a PSS 332 and a PBCH signal 333 using Beam #3 during time interval t$_3$, and a PSS 342 and a PBCH signal 343 using Beam #4 during time interval t$_4$. Similar to FIG. 2, a secondary synchronization signal (SSS) may accompany the PSSs and PBCH signals in each of the respective time intervals.

In this example, the PSS 312, 322, 332, 342 are generated based on permutations of a root sequence and different indices (I1, I2, I3, I4). Each of the indices I1, I2, I3, I4 may correspond to a different permutation parameter value. In one example, the index I1 is associated with a permutation parameter value of zero (e.g., A=0) such that the PSS 312 is generated based on a root sequence, and the indices I2, I3, I4 are associated with non-zero permutation parameter values such that each of the PSSs 322, 332, 342 are generated based on a different permutation of the root sequence.

Figure 4:
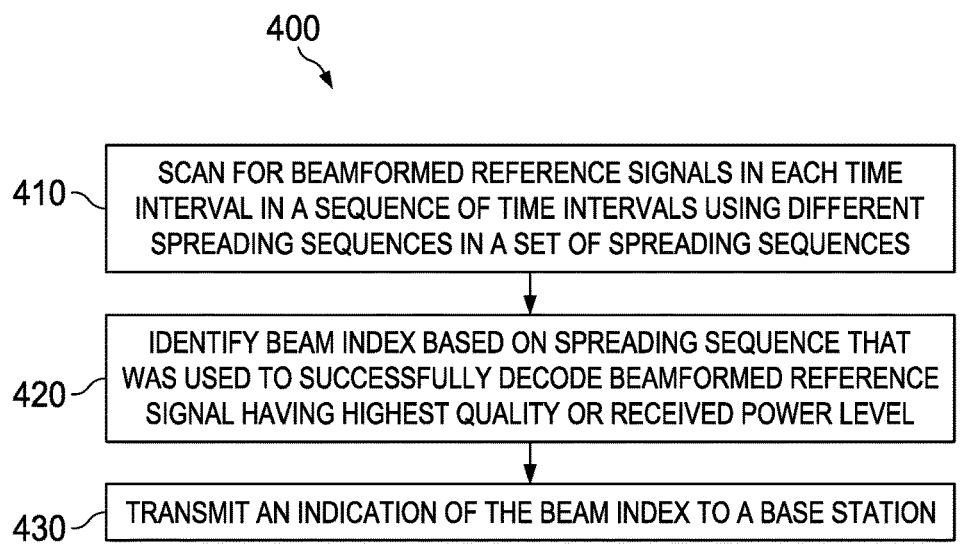
FIG. 4 is a flowchart of an embodiment beam-scanning method.

FIG. 4 is a flowchart of an embodiment beam-scanning method 400, as may be performed by a UE. At step 410, the UE scans for beamformed reference signals in each time interval in a sequence of time intervals using different spreading sequences in a set of spreading sequences. At step 420, the UE identifies a beam index based on a spreading sequence that was used to successfully decode beamformed reference signal having a highest quality or received power level. At step 430, the UE transmits an indication of the beam index to a base station.

Figure 5:
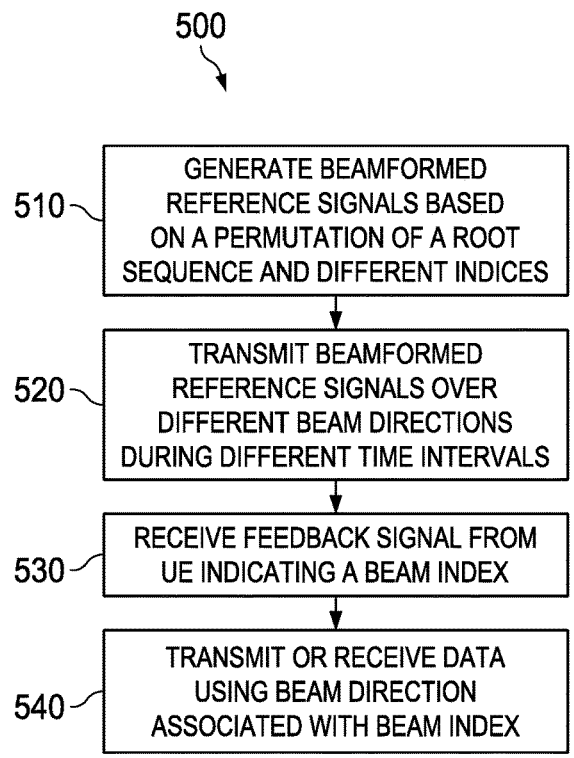
FIG. 5 is a flowchart of another embodiment beam-scanning method.

FIG. 5 is a flowchart of an embodiment beam-scanning method 500, as may be performed by a base station. At step 510, the base station generates beamformed reference signals based on a permutation of a root sequence and different indices. At step 520, the base station transmits beamformed reference signals over different beam directions during different time intervals. At step 530, the base station receives a feedback signal from a UE indicating a beam index. At step 540, the base station transmits or receives data using a beam direction associated with the beam index.

As discussed above, each spreading sequence in a given set of spreading sequences is generated based on a permutation of a root sequence and a permutation parameter value associated with an index. The root sequence may be a Zadoff-Chu sequence, which is a generalized form of a Chu sequence defined as:

$$x_u(n) = \exp\left(-j\frac{\pi u n(n+1)}{N}\right)$$

where:

$0 \leq n < N$, $0 < u < N$ and $GCD(N,u)=1$, $N$=length of sequence.

In general, the auto-correlation of a Zadoff-Chu sequence with a cyclically shifted version of itself is zero, and the cross-correlation between two spreading sequences generated from the same Zadoff-Chu sequence is generally less than $$\frac{1}{\sqrt{N}},$$

where N is the length of the root sequence. The value of a given element in a spreading sequence may be determined according to the following equation:

$$x_u^A(n) = x_u((A \cdot n) \bmod N) = x_U((n+B) \bmod N) \cdot e^{-j\frac{\pi \cdot C}{N}},$$

where u is a root index associated with the original root sequence, N is the length of the root sequence, n is an index of a symbol in the resulting spreading sequence, A is the permutation parameter, $$e^{-j\frac{\pi \cdot C}{N}}$$

is a rotation constant, and U, B, and C are constants that satisfy the following set of linear equations:

$U \equiv (u \cdot A^2) \bmod N$, $A \cdot (2B+1) \equiv 1 \bmod N$, $u \cdot A^2 \cdot B \cdot (B+1) + C \equiv 0 \bmod N$.

Different Zadoff-Chu sequences may be used to generate a set of spreading sequences. In one example, a Zadoff-Chu sequence associated with a root index of 25, 29, or 34, and having a length of 63 symbols, is used to generate a set of spreading sequences. In another example, a Zadoff-Chu sequence having a length equal to a prime number of symbols is used to generate a set of spreading sequences. In yet another example, a Zadoff-Chu sequence having a length equal to 127 symbols is used to generate a set of spreading sequences. The permutation parameter values used to generate a set of spreading sequences may include modular parameters. A mapping between a permutation parameter (e.g., modular or otherwise) may be predefined. Alternatively, a mapping between a permutation parameter (e.g., modular or otherwise) may be encoded and transmitted in a broadcast channel (e.g., a physical broadcast channel (PBCH)) or through an assisted frequency layer. A transmission gap, being consecutive time intervals in a sequence of time intervals, may be fixed. The transmission gap may be predefined. Alternatively, the transmission gap may be encoded and transmitted in a broadcast channel (e.g., a physical broadcast channel (PBCH)) or through an assisted frequency layer. A UE may transmit an index (e.g., a beam index) to the same base station from which the beamformed reference signal was received, or from a different base station. Upon receiving an index from a UE, a base station may transmit a signal to the UE over quasi co-located (QCL) antenna ports associated with the index.

Figure 6:
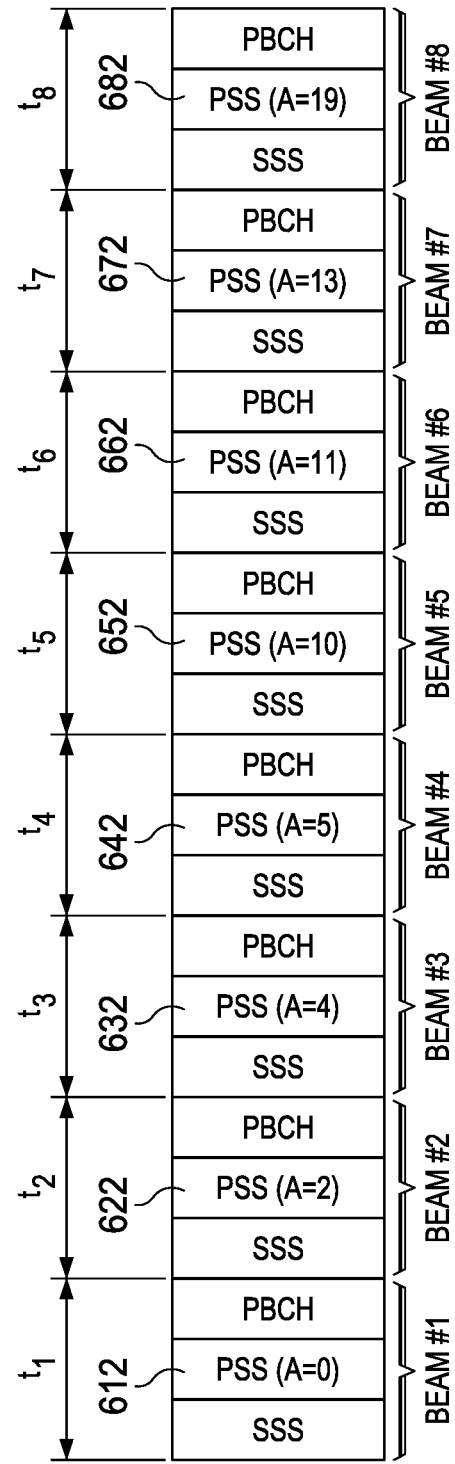
FIG. 6 is a diagram of another embodiment beam-scanning protocol.

The beamformed reference signals may be generated based on spreading sequences in a given set of spreading sequences, and the spreading sequences may be used by a UE to blindly detect the beamformed references in time intervals over which the beamformed reference signals are transmitted. FIG. 6 is a diagram of an embodiment beam-scanning protocol in which the base station 110 transmits PSSs 612-682 to the UE 120. As shown, the PSSs 612-682 are transmitted over different time intervals ($t_1$-$t_8$), and are generated based on a permutation of root sequence u=25 and a permutation parameter value (A) associated with a different beam index. In this example, the PSS 612 is generated based on the root sequence u=25, the PSS 622 is generated based a permutation of root sequence u=25 and a permutation parameter value of two (A=2) associated with beam index 1, the PSS 632 is generated based a permutation of root sequence u=25 and a permutation parameter value of four (A=4) associated with beam index 2, the PSS 642 is generated based a permutation of root sequence u=25 and a permutation parameter value of five (A=5) associated with beam index 3, the PSS 652 is generated based a permutation of root sequence u=25 and a permutation parameter value of ten (A=10) associated with beam index 4, the PSS 662 is generated based a permutation of root sequence u=25 and a permutation parameter value of eleven (A=11) associated with beam index 5, the PSS 672 is generated based a permutation of root sequence u=25 and a permutation parameter value of thirteen (A=13) associated with beam index 6, and the PSS 682 is generated based a permutation of root sequence u=25 and a permutation parameter value of nineteen (A=19) associated with beam index 7.

The UE 120 may not know which root sequence (e.g., u=29, u=25, u=34, etc.) and permutation parameter value (e.g., A=0, A=2, . . . A=20) are used to generate a PSS in a given time interval. Accordingly, the UE 120 may need to perform as many as twenty four (8 times 3) iterations of blind decoding for each time interval ($t_1$-$t_9$) before the corresponding PSS is successfully detected.

Figure 7:
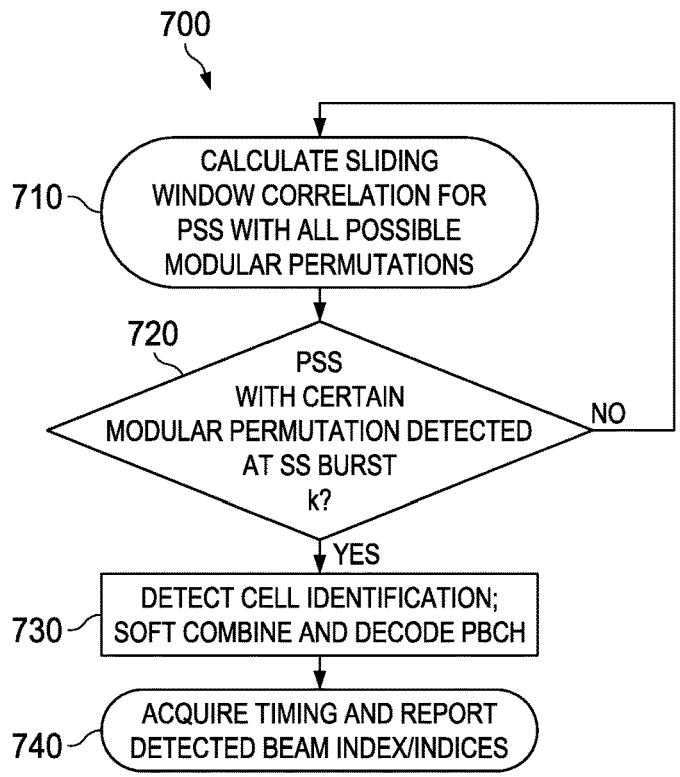
FIG. 7 is a flowchart of yet another embodiment beam-scanning method.

FIG. 7 is a flowchart of an embodiment beam-scanning method 700, as may be performed by a UE. At step 710, the UE calculates a sliding window correlation for PSSs with all possible modular permutations. At step 720, the UE attempts to detect a PSS with a certain modular permutation. If the PSS is not detected, then the method reverts back to step 710, where the UE adjusts the sliding window. Once a PSS is detected, the UE detects the cell_ID and decodes detected PBCH signals using a soft-combination decoding technique. At step 740, the UE acquires timing and reports detected beam indices.

Figure 8:
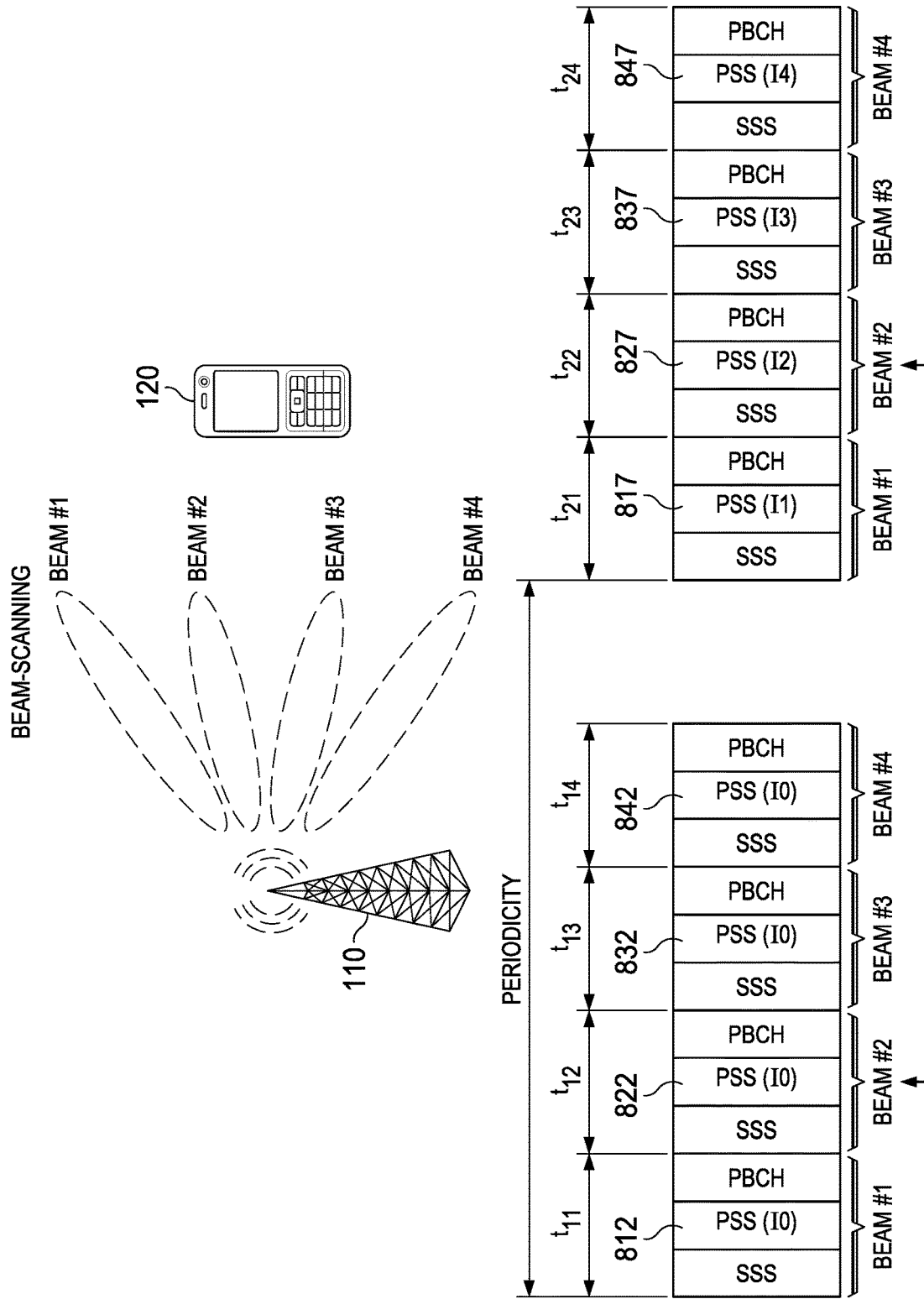
FIG. 8 is a diagram of yet another embodiment beam-scanning protocol.

FIG. 8 is a diagram of an embodiment beam-scanning protocol. As shown, the base station 110 transmits PSSs 812, 822, 832, 842 during a first sequence of time intervals ($t_{11}$-$t_{14}$), and PSSs 817, 827, 837, 847 during a second sequence of time intervals ($t_{21}$-$t_{24}$). In this example, each of the PSSs 812, 822, 332, 842 are generated using a spreading sequence associated with the same beam index (i.e., index 0 (I0)), while each of the PSSs 817, 827, 837, and 847 are generated using a spreading sequence associated with a different beam index (i.e., indices I1, I2, I3, and I4, respectively). In one example, the index I0 is associated with a permutation parameter value of zero (e.g., A=0) such that each of the PSSs 812, 822, 832, 842 are generated based on a root sequence, and the indices I1, I2, I3, I4 are associated with non-zero permutation parameter values such that each of the PSSs 817, 827, 837, 847 are generated based on a different permutation of the root sequence.

The UE 120 attempts to decode each of the PSSs 812, 822, 832, 842 using the spreading sequence associated with I0 (e.g., the root sequence). The UE 120 then uses the spreading sequences associated with the indices I1, I2, I3, I4 to blindly decode a PSS in a time interval ($t_{2x}$) in the second sequence that corresponds to the time interval ($t_{1x}$) in the first sequence of time intervals in which the PSS having the highest quality and/or received power level was detected. In this example, the PSS 822 in time interval $t_{12}$ has the highest quality and/or received power level, and the UE 120 blindly decodes the PSS 827 in time interval $t_{22}$.

Figure 9:
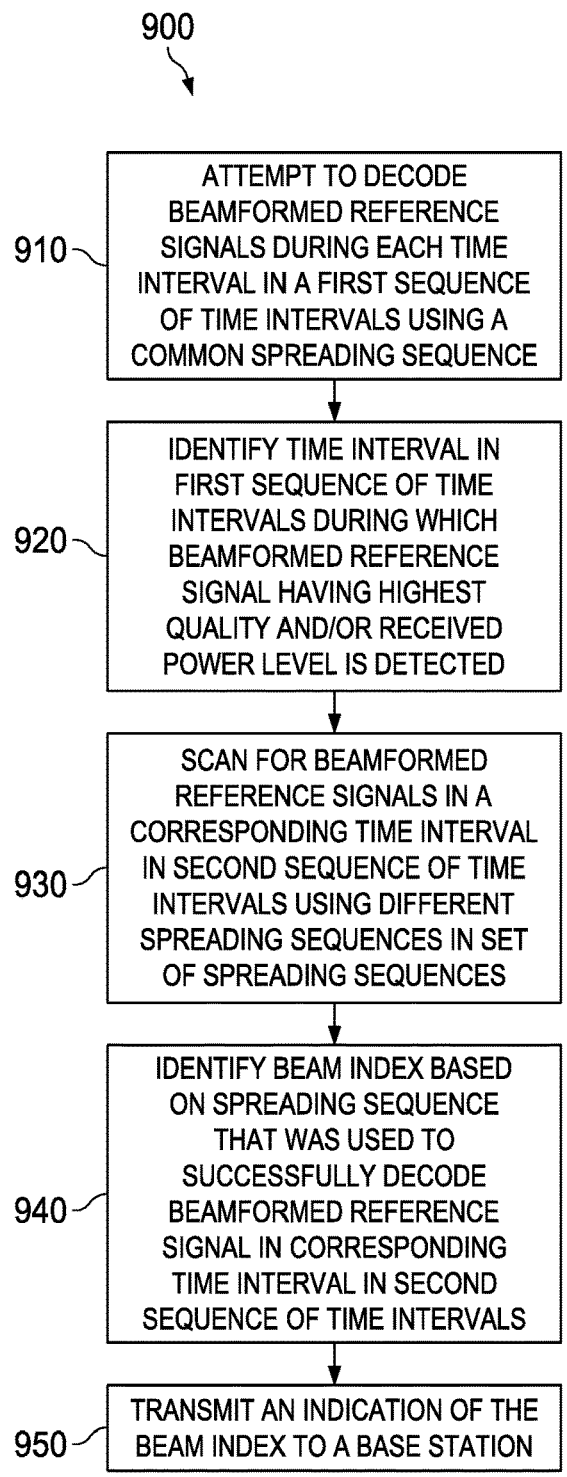
FIG. 9 is a flowchart of yet another embodiment beam-scanning method.

FIG. 9 is a flowchart of an embodiment beam-scanning method 900, as may be performed by a UE. At step 910, the UE attempts to decode beamformed reference signals during each time interval in a first sequence of time intervals using a common spreading sequence. At step 920, the UE identifies a time interval in the first sequence of time intervals during which a beamformed reference signal having highest quality and/or received power level is detected. At step 930, the UE scans for beamformed reference signals in a corresponding time interval in a second sequence of time intervals using different spreading sequences in set of spreading sequences. At step 940, the UE identifies a beam index based on a spreading sequence that was used to successfully decode a beamformed reference signal in the corresponding time interval in the second sequence of time intervals. At step 950, the UE transmits an indication of the beam index to a base station.

Figure 10:
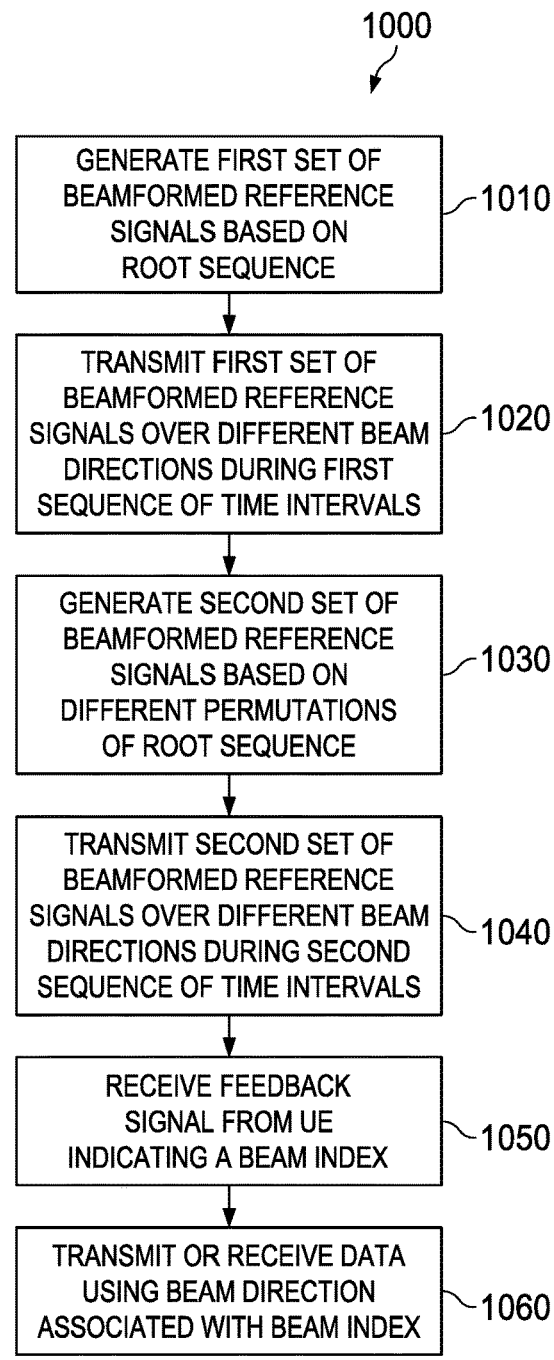
FIG. 10 is a flowchart of yet another embodiment beam-scanning method.

FIG. 10 is a flowchart of an embodiment beam-scanning method 1000, as may be performed by a base station. At step 1010, the base station generates a first set of beamformed reference signals based on a root sequence. At step 1020, the base station transmits the first set of beamformed reference signals over different beam directions during a first sequence of time intervals. At step 1030, the base station generates a second set of beamformed reference signals based on different permutations of the root sequence. At step 1040, the base station transmits the second set of beamformed reference signals over different beam directions during a second sequence of time intervals. At step 1050, the base station receives a feedback signal from a UE indicating a beam index. At step 1060, the base station transmits or receives data using a beam direction associated with the beam index.

Figure 11:
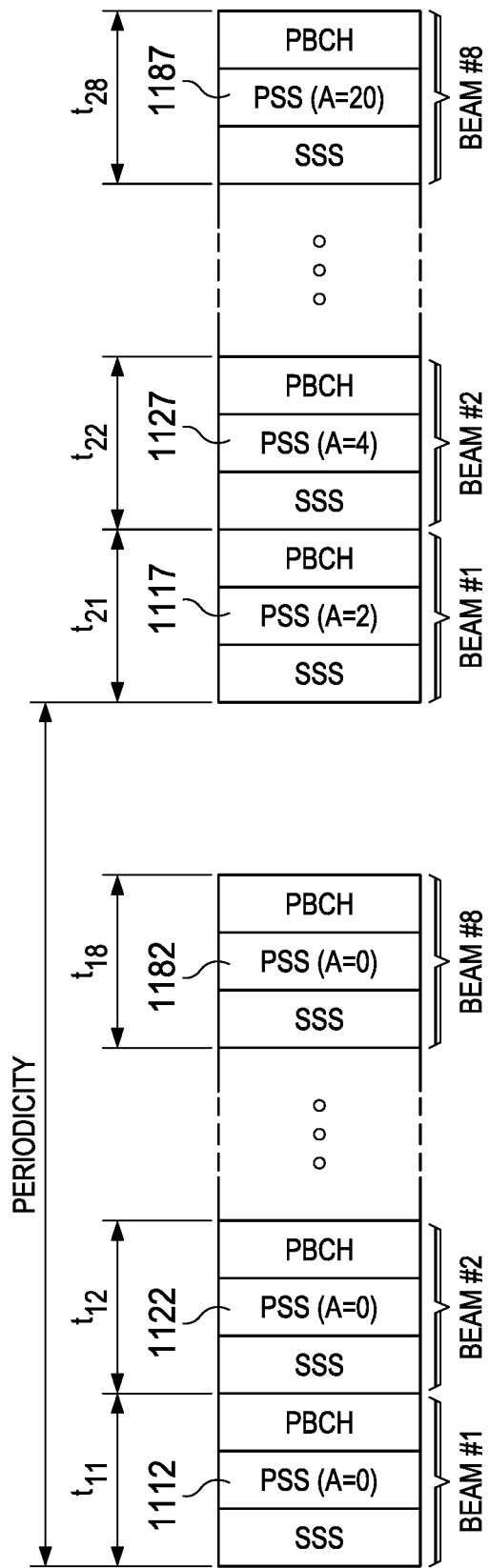
FIG. 11 is a diagram of an embodiment beam-scanning protocol.

FIG. 11 is a diagram of an embodiment beam-scanning protocol. In this example, the base station 110 transmits PSSs 1112-1187 to the UE 120. As shown, the base station 110 transmits PSSs 1112, 1122, . . . 1142 during a first sequence of time intervals ($t_{11}$-$t_{18}$), and PSSs 1117, 1127, . . . 1147 during a second sequence of time intervals ($t_{21}$-$t_{28}$). In this example, each of the PSSs 1112, 1122, . . . 1142 are generated using a root sequence u=25, and each of the PSSs 1117, 1127, . . . 1147 are generated using a different permutation of the root sequence.

Figure 12:
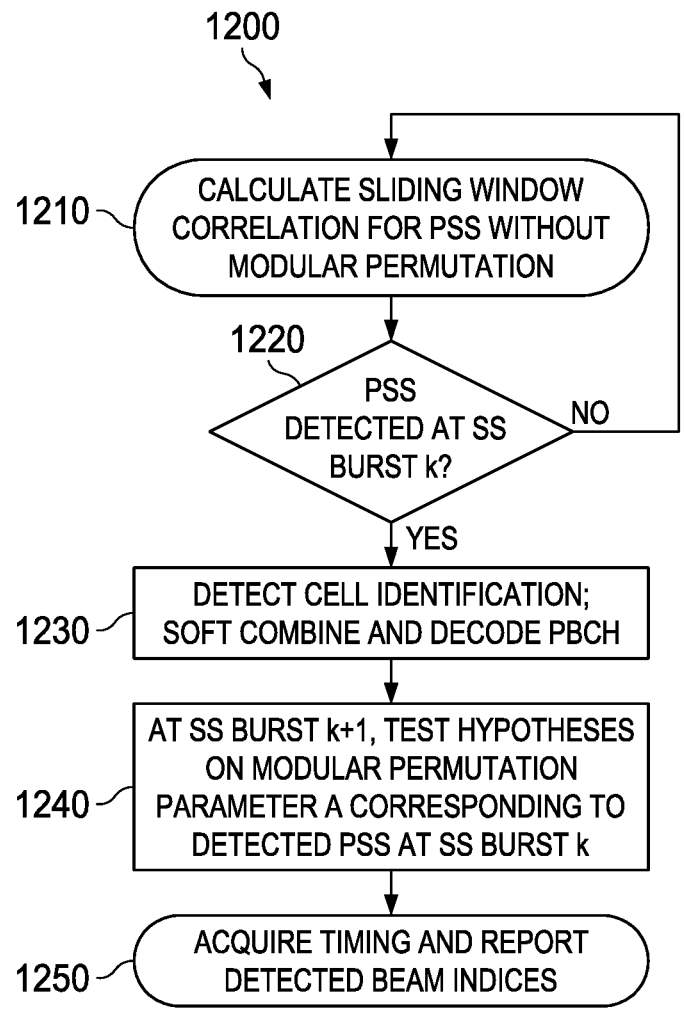
FIG. 12 is a flowchart of yet another embodiment beam-scanning method.

The UE 120 attempts to decode each of the PSSs 1112, 1122, . . . 1182 using the root sequence u=25. In this example, the UE determines that the PSS 1122 in time interval $t_{12}$ has the highest quality and/or received power level, and proceeds to blindly decode the PSS 1127 in time interval $t_{22}$ using different permutations (e.g., A=2, A=4, . . . A=20) of the root sequence u=25. In embodiments where the UE 120 does not know which root sequence is used to encode the PSS 1112, 1122, . . . 1182 prior to decoding the 1122, In some embodiments, the UE 120 does not know which root sequence is used to encode the PSS 1112, 1122, . . . 1182 before decoding the PSS 1122. In such embodiments, the UE 120 may attempt to blindly decode each of the PSSs 1112 and/or 1122 using the root sequences u=25, u=29, u=34. Upon successfully decoding either the PSSs 1112 and/or 1122 using the root sequences u=25, the UE 120 may determine that the PSS 1127 is encoded using a permutation of the root sequence u=25. This may reduce the number of blind decoding iterations performed during the time interval $t_{22}$ FIG. 12 is a flowchart of an embodiment beam-scanning method 1200, as may be performed by a UE. At step 1210, the UE calculates a sliding window correlation for PSSs without modular permutation. At step 1220, the UE attempts to detect a PSS with a certain modular permutation. If the PSS is not detected, then the method reverts back to step 1210, where the UE adjusts the sliding window. Once a PSS is detected, the UE detects the cell_ID and decodes detected PBCH signals using a soft-combination decoding technique at step 1230. At step 1240, the UE infers a modulation parameter corresponding to the detected PSS. At step 1250, the UE acquires timing and reports detected beam indices.

Parameters U, B, and C can be calculated as function of N, u, and A based on the following formulas.

$$x_u^A(n) = x_u((A \cdot n) \mathrm{mod} N) = x_U((n+B) \mathrm{mod} N) \cdot e^{-j\frac{\pi \cdot C}{N}};$$

$U \equiv (u \sim A^2) \bmod N$; $A \cdot (2B+1) \equiv 1 \bmod N$; and $u \cdot A^2 \cdot B \cdot (B+1) + C \equiv 0 \bmod N$.

In some embodiments, the values for U, B, and C are computed offline, and stored in a look up table. This allows the UE to determine the values of U, B, and C when performing blind decoding. FIG. 13 is a diagram of a look up table for root sequence u=29 having a length of 63 symbols. FIG. 14 illustrates a look up table for root sequence u=25 having a length of 63 symbols. FIG. 15 illustrates a look up table for root sequence u=34 having a length of 63 symbols. Although this disclosure primarily discusses root sequences u=25, u=29, u=34, it should be appreciated that embodiments of this disclosure may be used with other root sequences as well. By way of example, FIG. 16 illustrates a look up table for root sequence u=17 having a length of 47 symbols.

Embodiments of this disclosure provide beam indexing reference signal designs. Given a base sequence length of N and root sequence u, it is possible to generate a modular permutation table for different modular permutation parameter values, as well as calculate a new root sequence U, cyclic shift B, and constant rotation factor C. It is possible to choose the set of modular permutation parameter A for each root sequence. The selected set(s) of A may not necessarily be the same for all root sequences. The number of permutations used to generate a set of spreading sequences may cover the number of beams being swept. The selection of A sets may be done in a manner that avoids UE detection ambiguities. For example, no modular permuted sequence may have the same root index u and the same, or similar, cyclic shift B. The SS burst transmissions may be divided into two types of transmission occasions which are interleaved in time. In one type of transmission occasion, the normal PSS sequences are transmitted to provide the same detection performance and low complexity. In the other type of transmission occasion, the modular permutated sequences, corresponding to the beam index it represents, are transmitted. In some embodiments, a UE may not store all the modular permutated sequences, but may include hardware or software for generating modular permutation addresses.

Figure 17:
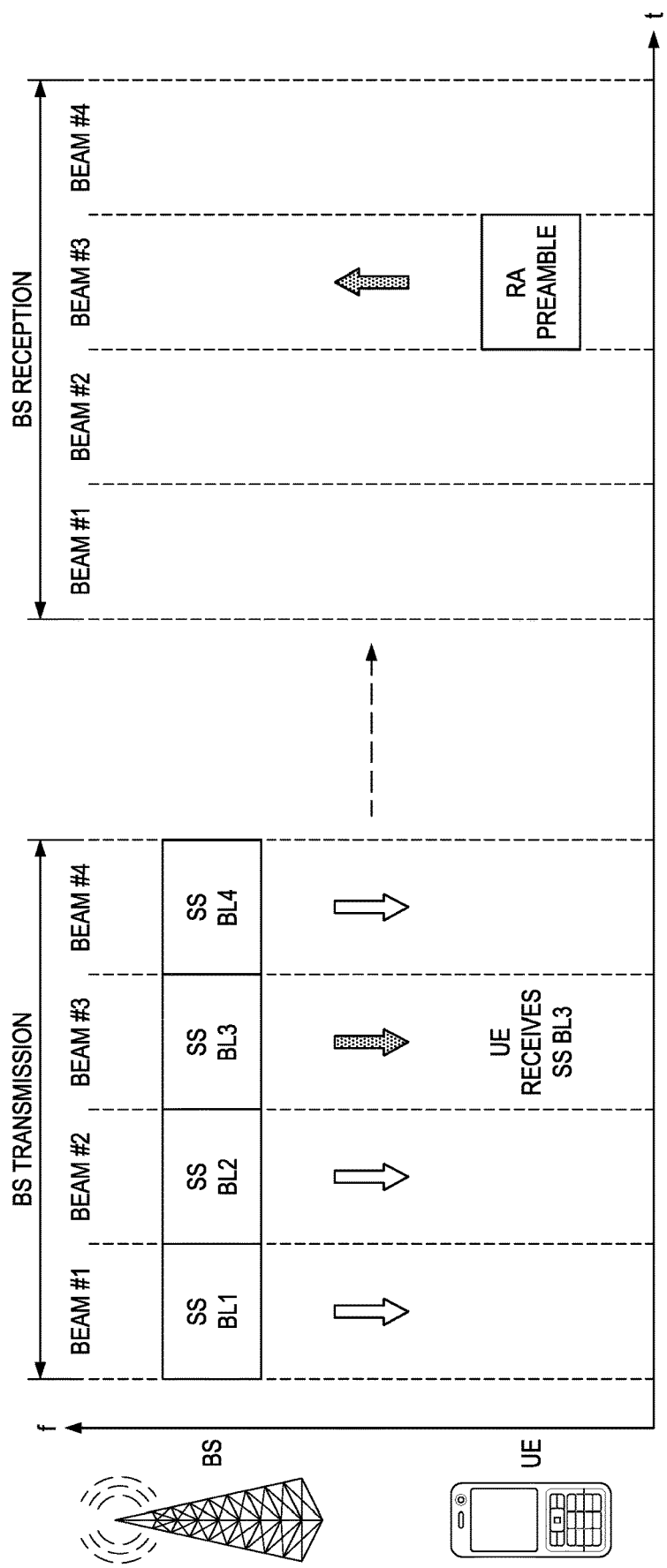
FIG. 17. is a diagram of yet another embodiment beam-scanning protocol.

Once a UE successfully receives one or more SS blocks transmitted by a BS, it should inform the network, through communications with the BS or another network entity, the index/indices of the SS block(s). The network can, then, use this information for beamforming towards the UE in order to establish a link or improve or maintain an existing link. If the UE wants to establish a link with the BS, it can initiate a random access (RA) procedure, for example, by transmitting a first message or a preamble to the BS. The SS block index/indices can be conveyed to the BS explicitly or implicitly. An example of explicit reporting of an SS block index is to embed the information in the first RA message or preamble transmitted to the BS. An example of implicit reporting of an SS block index is to communicate the information by choosing the timing of the RA preamble as shown in FIG. 17.

In this example, a base station transmits an SS burst of 4 SS blocks using 4 beams. The UEs may extract beam index information from preceding and succeeding SS bursts, which are not depicted in FIG. 17 for purposes of simplicity. A UE successfully receives SS block 3 from the base station, and transmits a random access (RA) preamble to the BS. The SS block 3 may carry transmission parameters and/or other information for transmitting the RA preamble. Since the base station may need to direct its beam to different directions (i.e., perform receive beamforming) for receiving RA preambles, it can sweep through its receive (RX) beams when scanning for the RA preambles. The RX beams may correspond to transmit (TX) beams used by the base station when transmitting the earlier SS blocks. Although the numbers of TX and RX beams swept by the base station are the same in this example, it should be appreciated that different numbers of TX and RX beams may be swept in other examples. Since the UE is aware of the timing of RA opportunities provided by the base station from different directions, it can transmit an RA preamble to the base station during the RA opportunity interval corresponding to beam 3. This timing implicitly informs the base station that the beam to communicate to the UE is beam 3.

In another embodiment, if a UE detects multiple SS blocks successfully, and the quality of the estimated channel corresponding to each of the SS blocks satisfies one or more criteria, then the UE may attempt to transmit RA preambles during multiple RA opportunities. The number of attempts may be limited, for example, by a threshold associated with the quality of the estimated channel and/or a maximum of the number of attempts.

Since RA opportunities from UEs in each "direction" may be limited, a probability of collision between RA preambles may be higher in directions having higher densities of UEs. In an embodiment, an RA preamble may be transmitted on a randomly chosen sub-band, or from a predetermined set of sub-bands, in order to reduce the probability of a collision between RA preambles from different UEs.

In another embodiment, a UE may choose to transmit multiple replicas of an RA preamble in multiple sub-bands in order to provide diversity. The BS may then use successive interference cancellation in the case that one replica of an RA preamble is received successfully and another replica has collided with the RA preamble with another UE.

Consider Chu sequences with a fixed value of N, but with different root values $u_i$ and permutation parameter $A_j$. It can be observed that the cross-correlation between any pair of the sequences with root values $u_{i1}$ and $u_{i2}$ and permutation parameters $A_{j1}$ and $A_{j2}$ is bounded by $\sqrt{N}$ provided that $u_{i1}-u_{i2}$ is relatively prime to N. However, for a fixed root value $u_i$, cross-correlations between Chu sequences corresponding to different values of $A_j$ are not necessarily bounded by $\sqrt{N}$ unless N is relatively prime to $A_{j1}-A_{j2}$. A consequence is that it is likely that a UE detects u correctly and obtains the correct cell ID, but it detects A incorrectly and calculates an incorrect SS block index.

In an embodiment, once the UE obtains values of u and A, it attempts to transmit multiple RA preambles during RA opportunities corresponding to a set of SS block indices that are the most likely. The number of attempts may be limited, for example, by a threshold on the quality of the estimated channel or by a maximum of the number of attempts.

Constraints and considerations regarding the choice of N, $u_i$, and $A_j$ were mentioned in the previous subsections in order to satisfy desired cross-correlation properties between different sequences.

An additional consideration is as follows. Depending on the design of additional synchronization signals, such as the SSS in the LTE system, certain values of the sequence length N may be preferable or necessary. For example, if an SSS is composed by one or more maximum-length sequences (m-sequences), the resulting length is $2^n-1$ for some integer n. Then, if a PSS is desired to have the same length as the SSS, $N=2^n-1$ is desired for some integer n. Examples are N=63 and N=127. From these two example values, the advantage of N=63 is a smaller hardware overhead compared to hardware for the LTE, while N=127 is a prime number providing a larger set of possible values of A for SS block indexing.

Figure 18:
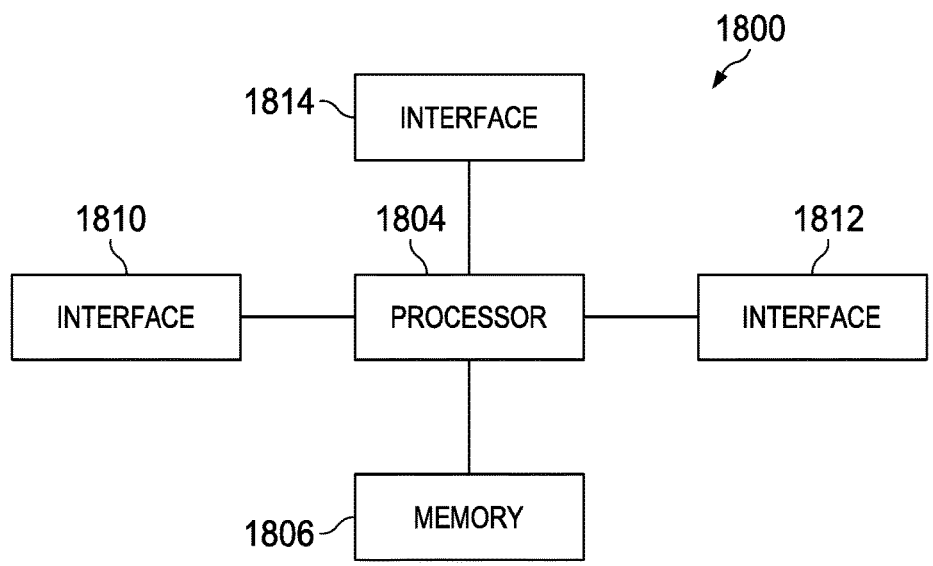
FIG. 18 is a block diagram of an embodiment processing system for performing methods described herein.

FIG. 18 illustrates a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 18. The processor 1804 may be any component or collection of components adapted to perform computations and/or other processing related tasks, and the memory 1806 may be any component or collection of components adapted to store programming and/or instructions for execution by the processor 1804. A means for configuring a context for a UE may include processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in FIG. 18, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
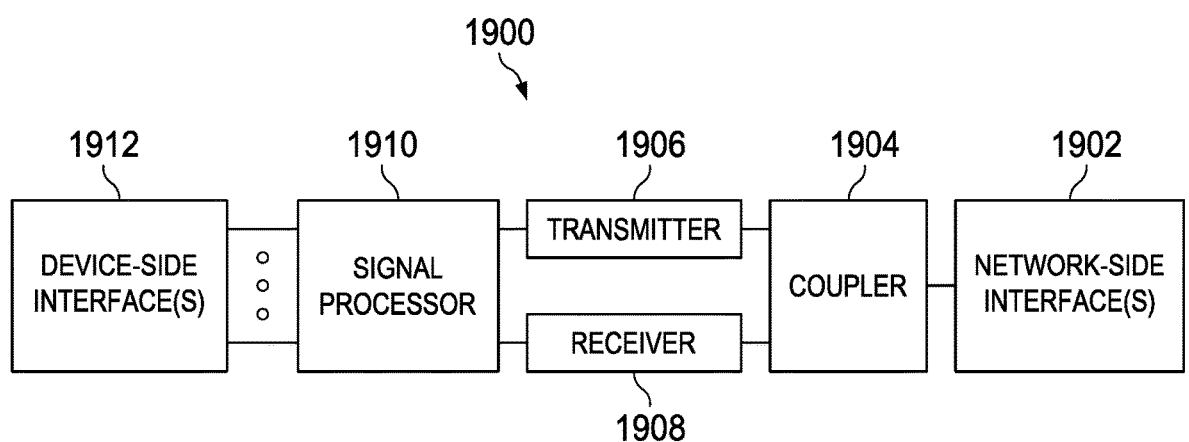
FIG. 19 is a block diagram of a transceiver adapted to transmit and receive signaling over a telecommunications network according to example embodiments described herein.

In some embodiments, one or more of the interfaces 1810, 1812, 1814 connects the processing system 1800 to a transceiver adapted to transmit and receive signaling over the telecommunications network. FIG. 19 illustrates a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and a device-side interface 1912. The network-side interface 1902 may include any component or collection of components adapted to transmit or receive signaling over a wireless or wireline telecommunications network. The network-side interface 1902 may also include any component or collection of components adapted to transmit or receive signaling over a short-range interface. The network-side interface 1902 may also include any component or collection of components adapted to transmit or receive signaling over a Uu interface. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. A means for transmitting an initial message of an access procedure may include transmitter 1906. The receiver 1908 may include any component or collection of components (e.g., down-converter, low noise amplifier, etc.) adapted to convert a carrier signal received over the network-side interface 1902 into a baseband signal. A means for receiving mobile subscriber identifiers, initial downlink messages of access procedures, and forwarded requests to connect to a network may include receiver 1908.

The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a detecting unit/module, a permutating unit/module, a mapping unit/module, an encoding unit/module, a decoding unit/module, and/or an identifying unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method for wireless communications, the method comprising:
    transmitting, by a network node, a first synchronization signal during a first time interval, wherein the first synchronization signal is encoded with a first spreading sequence generated by permutating a root sequence based on a first permutation parameter associated with a first beam index, the first synchronization signal identifying the first beam index by virtue of the first synchronization signal being encoded with the first spreading sequence;
    transmitting, by the network node, a second synchronization signal during a second time interval, wherein the second synchronization signal is encoded with a second spreading sequence generated by permutating the root sequence based on a second permutation parameter associated with a second beam index, the second synchronization signal identifying the second beam index by virtue of the second synchronization signal being encoded with the second spreading sequence, the second permutation parameter associated with the second beam index being different than the first permutation parameter associated with the first beam index; and
    receiving, by the network node, an indication of either the first beam index or the second beam index from a user equipment (UE).

2. The method of claim 1, wherein a cross-correlation between the first spreading sequence and the second spreading sequence is less than $$\frac{1}{\sqrt{N}},$$

where N is a length of the root sequence.

3. The method of claim 2, wherein the root sequence is a Zadoff-Chu sequence.

4. The method of claim 3, wherein the Zadoff-Chu sequence is associated with a root index equal to 25, 29, or 34, and wherein the Zadoff-Chu sequence has a length of 63 symbols.

5. The method of claim 3, wherein a length of the Zadoff-Chu sequence is equal to a prime number of symbols.

6. The method of claim 1, wherein the first beam index and the second beam index are associated with different beam directions.

7. The method of claim 1, wherein the first permutation parameter associated with the first beam index is a first modular parameter.

8. The method of claim 7, wherein a mapping between the first modular parameter and the first beam index is pre-defined, encoded, and transmitted in a broadcast channel, or encoded and signaled through an assisted frequency layer.

9. The method of claim 8, wherein the broadcast channel is a physical broadcast channel (PBCH).

10. The method of claim 1, wherein the first time interval and the second time interval are separated by a fixed transmission gap.

11. The method of claim 10, wherein the fixed transmission gap between the first time interval and the second time interval is pre-defined, encoded and signaled through an assisted frequency layer, or encoded and transmitted over a broadcast channel.

12. The method of claim 11, wherein the broadcast channel is a physical broadcast channel (PBCH).

13. The method of claim 1, further comprising:
    transmitting, by the network node, a signal to the UE over quasi co-located (QCL) antenna ports associated with the first beam index indicated by the indication received from the UE.

14. A method for wireless communications, the method comprising:
    receiving, by a user equipment (UE), a first synchronization signal from a first network node during a first time interval and a second synchronization signal from the first network node during a second time interval that is different than the first time interval;
    decoding, by the UE, the first synchronization signal in accordance with a first spreading sequence to identify a first beam index associated with the first spreading sequence, the first beam index corresponding to a first beam direction used to transmit the first synchronization signal;
    decoding, by the UE, the second synchronization signal in accordance with a second spreading sequence to identify a second beam index associated with the second spreading sequence, the second beam index corresponding to a second beam direction used to transmit the second synchronization signal, the second beam index being different than the first beam index; and transmitting, by the UE, an indication of the first beam index to the first network node or a second network node.

15. The method of claim 14, wherein the indication of the first beam index is transmitted to the first network node.

16. The method of claim 14, wherein a cross-correlation between the first spreading sequence and the second spreading sequence is less than $$\frac{1}{\sqrt{N}},$$

where N is a length of the root sequence.

17. A method for beam-scanning, the method comprising:

receiving, by a user equipment (UE), beamformed reference signals and at least a first instance of a common physical broadcast channel (PBCH) signal during an initial sequence of time intervals, wherein each of the beamformed reference signals are received during a different time interval in the initial sequence of time intervals;

performing blind decoding on the beamformed reference signals using a common spreading sequence until at least a first instance of a specific one of the beamformed reference signals is decoded using the common spreading sequence, the first instance of the specific beamformed reference signal being received during a specific time interval in the initial sequence of time intervals, the specific time interval in the initial sequence of time intervals being mapped to a specific time interval in a subsequent sequence of time intervals; and receiving, by the UE, a second instance of the beamformed reference signal and a second instance of the common PBCH signal during the specific time interval of the subsequent sequence of time intervals, the first instance of the common PBCH signal transmitted over a different beam direction than the second instance of the common PBCH signal;

performing blind decoding on the second instance of the beamformed reference signal using different spreading sequences in a set of spreading sequences, each spreading sequence in the set of spreading sequences being associated with a different beam index;

identifying a beam index based on a specific spreading sequence used to successfully decode the beamformed reference signal;

transmitting, by the UE, an indication of the beam index to a network node;

combining first instance bits in the first instance of the common PBCH signal with second instance bits in the second instance of the common PBCH signal to obtain a soft combination of bits corresponding to the common PBCH signal; and decoding the soft combination of bits corresponding to the common PBCH signal to obtain control information carried by the common PBCH signal.

18. The method of claim 17, wherein each spreading sequence in the set of spreading sequences has zero cross-correlation with other spreading sequences in the set of spreading sequences.

19. The method of claim 17, wherein the beamformed reference signals include a primary synchronization signal (PSS).

20. The method of claim 19, wherein the first instance of the common PBCH signal does not specify the beam index.

21. A method for wireless communications, the method comprising:

transmitting, by a network node, a first synchronization signal during a first time interval, the first synchronization signal encoded with a first spreading sequence generated by permutating a root sequence based on a first permutation parameter associated with a first index, the first synchronization signal identifying the first index by virtue of the first synchronization signal being encoded with the first spreading sequence;

transmitting, by the network node, a second synchronization signal during a second time interval, the second synchronization signal encoded with a second spreading sequence generated by permutating the root sequence based on a second permutation parameter associated with a second index, the second synchronization signal identifying the second index by virtue of the second synchronization signal being encoded with the second spreading sequence, the second permutation parameter associated with the second index being different than the first permutation parameter associated with the first index; and receiving, by the network node, an indication of either the first index or the second index from a user equipment (UE).

22. The method of claim 21, wherein the first index and the second index are associated with different beams.

23. A network node comprising:

a processor; and a non-transitory computer readable storage medium storing programming for execution by the processor, the programming including instructions to:

transmit a first synchronization signal during a first time interval, wherein the first synchronization signal is encoded with a first spreading sequence generated by permutating a root sequence based on a first permutation parameter associated with a first beam index, the first synchronization signal identifying the first beam index by virtue of the first synchronization signal being encoded with the first spreading sequence;

transmit a second synchronization signal during a second time interval, wherein the second synchronization signal is encoded with a second spreading sequence generated by permutating the root sequence based on a second permutation parameter associated with a second beam index, the second synchronization signal identifying the second beam index by virtue of the second synchronization signal being encoded with the second spreading sequence, the second permutation parameter associated with the second beam index being different than the first permutation parameter associated with the first beam index; and receive an indication of either the first beam index or the second beam index from a user equipment (UE).

24. The network node of claim 23, wherein the root sequence is a Zadoff-Chu sequence.

25. The network node of claim 24, wherein the Zadoff-Chu sequence is associated with a root index equal to 25, 29, or 34, and wherein the Zadoff-Chu sequence has a length of 63 symbols.

26. The network node of claim 24, wherein a length of the Zadoff-Chu sequence is equal to a prime number of symbols.

27. A user equipment (UE) comprising:
a processor; and
a non-transitory computer readable storage medium storing programming for execution by the processor, the programming including instructions to:
receive a first synchronization signal from a first network node during a first time interval and a second synchronization signal from the first network node during a second time interval that is different than the first time interval;
decode the first synchronization signal in accordance with a first spreading sequence to identify a first beam index associated with the first spreading sequence, the first beam index corresponding to a first beam direction used to transmit the first synchronization signal;
decode the second synchronization signal in accordance with a second spreading sequence to identify a second beam index associated with the second spreading sequence, the second beam index corresponding to a second beam direction used to transmit the first synchronization signal, the second beam index being different than the first beam index; and
transmit an indication of the first beam index to the first network node or a second network node.

* * * * *